（12） United States Patent
Katsuda et al.

(10) Patent No.: US 12,449,168 B2
(45) Date of Patent: Oct. 21, 2025

(54) POSITIVE DISPLACEMENT MACHINE, COMPRESSOR, COOLING DEVICE, AND ELECTRONIC APPARATUS

(71) Applicant: SEIKO EPSON CORPORATION, Tokyo (JP)

(72) Inventors: Osamu Katsuda, Matsumoto (JP); Hidemasa Yamakawa, Matsumoto (JP); Kaname Nagatani, Matsumoto (JP); Tomoki Abe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 269 days.

(21) Appl. No.: 17/954,862

(22) Filed: Sep. 28, 2022

(65) Prior Publication Data

US 2023/0097432 A1 Mar. 30, 2023

(30) Foreign Application Priority Data

Sep. 29, 2021 (JP) ................. 2021-159502

(51) Int. Cl.
*F25B 31/02* (2006.01)
*F04B 35/01* (2006.01)

(52) U.S. Cl.
CPC ............ *F25B 31/023* (2013.01); *F04B 35/01* (2013.01); *F25B 2500/06* (2013.01)

(58) Field of Classification Search
CPC ...... F25B 31/023; F04B 35/04; F04B 39/041; F04B 53/145; F04B 35/01; F04B 39/042; F04B 39/0022

See application file for complete search history.

(56) References Cited

U.S. PATENT DOCUMENTS 3,771,911 A * 11/1973 Turci ..................... F04B 35/04
92/101
4,864,814 A * 9/1989 Albert ...................... F02G 3/02
60/39.63

(Continued)

FOREIGN PATENT DOCUMENTS

DE 102010003086 A1 * 9/2011 .............. F04B 39/02
EP 3168473 A1 5/2017

(Continued)

OTHER PUBLICATIONS

17954862_2024-08-20_DE_102010003086_A1 (Year:2011).*
17954862_2024-08-18_JP_2005042568_A (Year:2005).*

*Primary Examiner* — Frantz F Jules
*Assistant Examiner* — Martha Tadesse
(74) *Attorney, Agent, or Firm* — Oliff PLC

(57) ABSTRACT

A positive displacement machine includes a case including a tubular guide part in which a pressure chamber is provided, a slide member including a shaft extending in a first direction and a piston provided at an end portion of the shaft and disposed in the guide part, a coupling member coupled to the slide member and extending in a second direction intersecting the first direction, a first rotating member coupled to one end of the coupling member and configured to rotate around a first rotation axis extending in the second direction, and a rocking absorbing mechanism configured to absorb a rocking motion of the piston around an axis extending in the first direction. The rocking absorbing mechanism is provided between the coupling member and the slide member, between the shaft and the piston, or between the piston and an inner wall of the guide part.

8 Claims, 4 Drawing Sheets

(56) References Cited

U.S. PATENT DOCUMENTS 6,102,670 A * 8/2000 Taguchi .............. F04B 27/1804
417/270
2013/0189140 A1* 7/2013 Kabir ....................... F04B 7/04
417/510

FOREIGN PATENT DOCUMENTS

| JP | H09-072275 A | | 3/1997 | |
|----|--------------|---|--------|---|
| JP | 2005042568 | * | 2/2005 | |
| JP | 2016-017513 A | | 2/2016 | |
| JP | 2017-008918 A | | 1/2017 | |
| WO | WO-2016006685 A1 | * | 1/2016 | .............. F04B 35/01 |

* cited by examiner

POSITIVE DISPLACEMENT MACHINE, COMPRESSOR, COOLING DEVICE, AND ELECTRONIC APPARATUS

The present application is based on, and claims priority from JP Application Serial Number 2021-159502, filed Sep. 29, 2021, the disclosure of which is hereby incorporated by reference herein in its entirety.

BACKGROUND

1. Technical Field

The present disclosure relates to a positive displacement machine, a compressor, a cooling device, and an electronic apparatus.

2. Related Art

There has been known a positive displacement machine used in a compressor for refrigeration, an internal combustion engine for generator driving, and the like (see, for example, JP-A-9-072275 (Patent Literature 1)).

The positive displacement machine described in Patent Literature 1 is a hermetic compressor. The hermetic compressor includes a reciprocating member including two pistons, a cylinder block, two arm sections, two spherical bushes, and two driving shafts including driving arm sections. The two pistons are supported by an inner circumferential cylindrical surface of the cylinder block to be capable of carrying out a reciprocating motion and a rocking motion around an axis in a reciprocating direction. Each of the two arm sections is rotatably inserted into an inner circumferential cylindrical surface section of the spherical bush corresponding to the arm section. Outer circumferential spherical sections of the spherical bushes are supported in positions deviating from rotation axes of the driving shafts by the driving arm sections of the driving shafts corresponding to the outer circumferential spherical sections.

In such a hermetic compressor, the driving arm sections rotate around the driving shafts and the two arm sections coupled to the driving arm sections via the spherical bushes move in the reciprocating direction, whereby the reciprocating member reciprocates in the cylinder block. Consequently, the pistons perform the rocking motion while reciprocating on the inner circumferential cylindrical surface of the cylinder block, whereby working fluid flowing into a working space is discharged to the outside after being compressed.

In the positive displacement machine described in Patent Literature 1, as explained above, the two driving arm sections rotate in opposite directions each other around the driving shafts, whereby the arm sections coupled to the reciprocating member reciprocates and rocks around the axis in the reciprocating direction. Accordingly, when the positive displacement machine is driven, not only force by the reciprocating motion of the pistons but also force by the rocking of the pistons is applied to the cylinder block and the pistons reciprocating in the cylinder block. Therefore, friction caused between the cylinder block and the pistons increases and the positive displacement machine is deteriorated. In particular, when the pistons move toward the top dead point, pressure by compression of gas is applied to the cylinder block and the pistons and the rocking of the pistons increases. Therefore, such a problem becomes conspicuous.

SUMMARY

A positive displacement machine according to an aspect of the present disclosure includes: a case including a tubular guide part in which a pressure chamber is provided; a slide member including a shaft extending in a first direction and a piston provided at an end portion of the shaft and disposed in the guide part, the slide member sliding in the first direction; a coupling member coupled to the slide member and extending in a second direction crossing the first direction; a first rotating member coupled to one end of the coupling member and configured to rotate centering on a first rotation axis extending in the second direction; and a rocking absorbing mechanism configured to absorb a rocking motion of the piston centering on an axis extending in the first direction. The rocking absorbing mechanism is provided between the coupling member and the slide member, between the shaft and the piston, or between the piston and an inner wall of the guide part.

A compressor according to an aspect of the present disclosure includes: the positive displacement machine; and a driving device configured to rotate the first rotating member. The piston compresses gas flowing into the pressure chamber.

A cooling device according to an aspect of the present disclosure includes: the compressor configured to compress working fluid in a gas phase; a condenser configured to condense the working fluid in the gas phase compressed by the compressor into the working fluid in a liquid phase; an expander configured to decompress the working fluid in the liquid phase condensed by the condenser and change a state of the working fluid to a state in which the liquid phase and the gas phase are mixed; and an evaporator connected to a cooling target to be capable of transferring heat and configured to change the working fluid flowing from the expander to the working fluid in the gas phase with heat transferred from the cooling target and discharge the changed working fluid in the gas phase to the compressor.

An electronic apparatus according to an aspect of the present disclosure includes the cooling device.

DESCRIPTION OF EXEMPLARY EMBODIMENTS

First Embodiment

Figure 1:
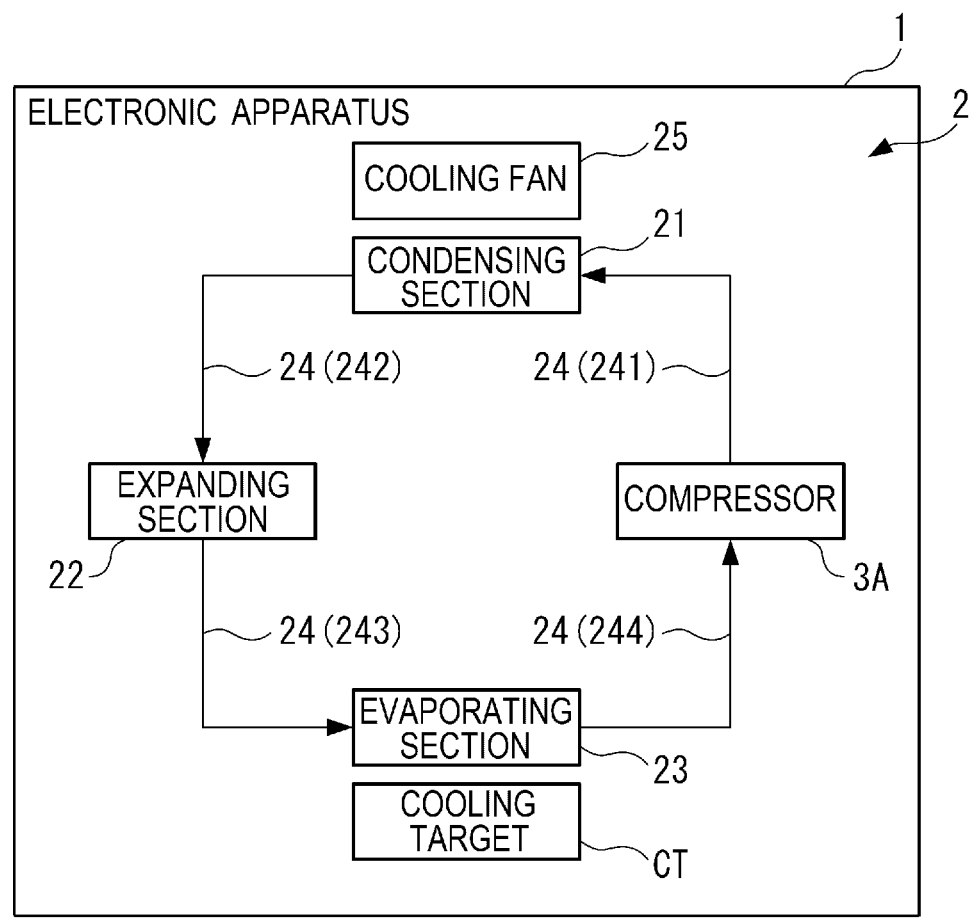
FIG. 1 is a block diagram showing the configuration of an electronic apparatus according to a first embodiment.

A first embodiment of the present disclosure is explained below with reference to the drawing.

Configuration of Electronic Apparatus

FIG. 1 is a block diagram showing the configuration of an electronic apparatus 1 according to this embodiment.

The electronic apparatus 1 according to this embodiment includes, as shown in FIG. 1, a cooling target CT and a cooling device 2.

The cooling target CT configures the electronic apparatus 1. Examples of the cooling target CT include a control device that controls the electronic apparatus 1 and a power supply device that supplies electric power to electronic components of the electronic apparatus 1.

Configuration of the Cooling Device

The cooling device 2 cools the cooling target CT. Specifically, the cooling device 2 circulates working fluid, a phase of which changes between a liquid phase and a gas phase, and cools the cooling target CT.

The cooling device 2 includes a compressor 3A, a condenser 21, an expander 22, an evaporator 23, a plurality of pipes 24, and a cooling fan 25.

Schematic Configuration of the Compressor

The compressor 3A compresses the working fluid in the gas phase. That is, the compressor 3A compresses the working fluid in the gas phase flowing in from the evaporator 23 to thereby raise the temperature and the pressure of the working fluid in the gas phase. The working fluid in the gas phase, the temperature and the pressure of which are raised by the compressor 3A, flows to the condenser 21.

The configuration of the compressor 3A is explained in detail below.

Configuration of the Condenser

The condenser 21 is connected to the compressor 3A via the pipe 24. The condenser 21 condenses the working fluid in the gas phase compressed by the compressor 3A, that is, the working fluid in the gas phase raised in the temperature and the pressure into the working fluid in the liquid phase. Specifically, the condenser 21 performs heat exchange between the compressed working fluid in the gas phase and a cooling gas circulated to the condenser 21 by the cooling fan 25 to thereby condense the working fluid in the gas phase into the working fluid in the liquid phase having high pressure.

Configuration of the Expander

The expander 22 is a decompressor and is connected to the condenser 21. The expander 22 decompresses the working fluid in the liquid phase condensed by the condenser 21 and changes a state of the working fluid to a state in which the liquid phase and the gas phase are mixed. That is, the expander 22 lowers the temperature of the working fluid. The expander 22 discharges the working fluid in the state in which the liquid phase and the gas phase are mixed to the evaporator 23. The expander 22 can be configured by, for example, an expansion valve, specifically, an electronic expansion valve capable of controlling an evaporation temperature of the working fluid in the liquid phase and can be configured by a capillary tube.

Configuration of the Evaporator

The evaporator 23 is connected to the cooling target CT to be capable of transferring heat. The evaporator 23 evaporates, with the heat transferred from the cooling target CT, the working fluid in the liquid phase flowing from the expander 22 to change the working fluid in the liquid phase to the working fluid in the gas phase and discharges the changed working fluid in the gas phase to the compressor 3A. Consequently, the heat of the cooling target CT is consumed and the cooling target CT is cooled.

Configuration of the Plurality of Pipes

The plurality of pipes 24 annularly connect the compressor 3A, the condenser 21, the expander 22, and the evaporator 23. The plurality of pipes 24 are tubular members, on the inside of which the working fluid can flow.

The plurality of pipes 24 include a first pipe 241, a second pipe 242, a third pipe 243, and a fourth pipe 244.

The first pipe 241 connects the compressor 3A and the condenser 21.

The second pipe 242 connects the condenser 21 and the expander 22.

The third pipe 243 connects the expander 22 and the evaporator 23.

The fourth pipe 244 connects the evaporator 23 and the compressor 3A.

In this way, the cooling device 2 includes a circulation route of the working fluid that flows through the compressor 3A, the first pipe 241, the condenser 21, the second pipe 242, the expander 22, the third pope 243, the evaporator 23, and the fourth pipe 244 in order and flows into the compressor 3A again. The circulation route cools the cooling target CT.

Detailed Configuration of the Compressor

Figure 2:
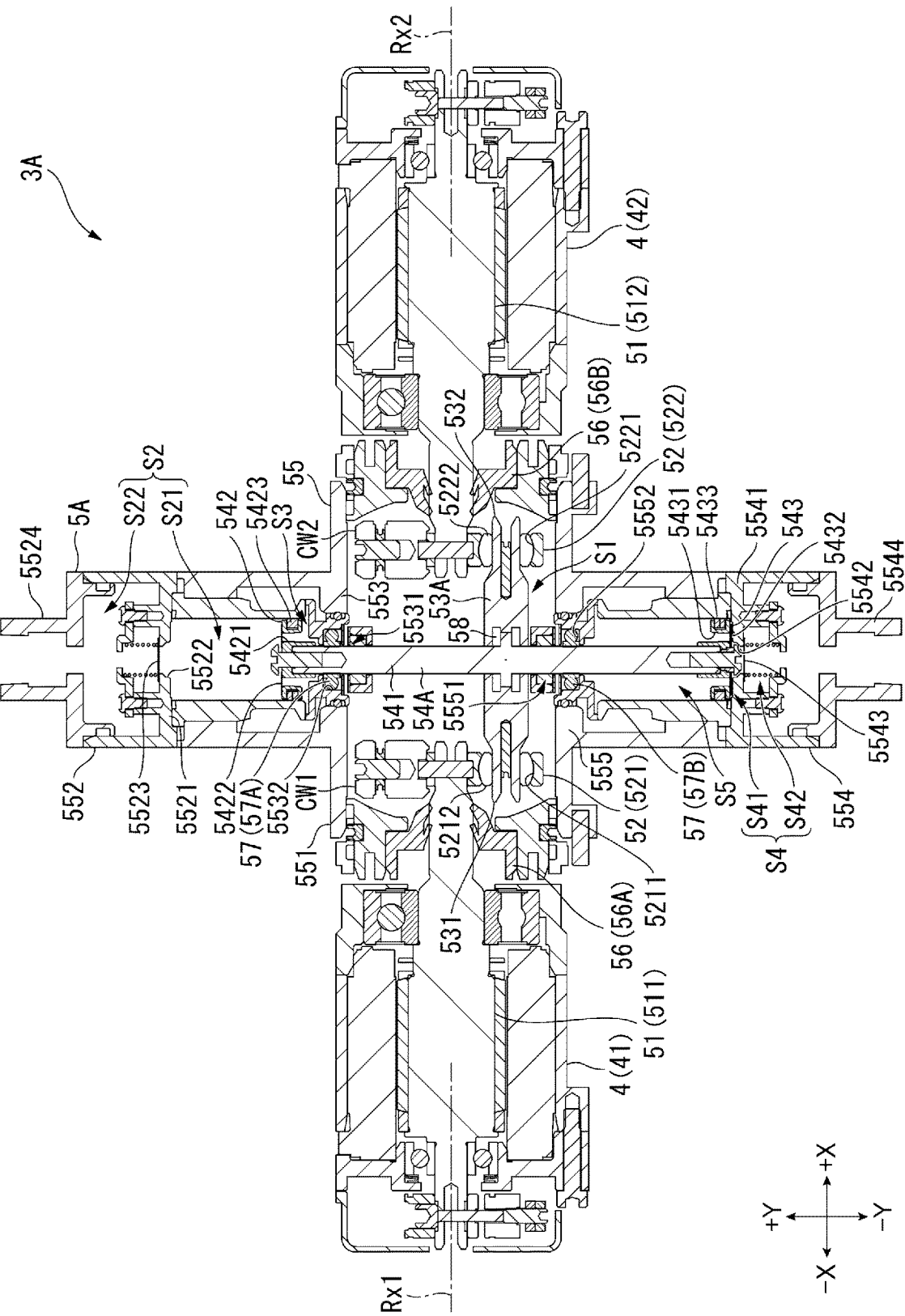
FIG. 2 is a sectional view showing a compressor according to the first embodiment.

FIG. 2 is a sectional view showing the compressor 3A.

As explained above, the compressor 3A compresses the working fluid in the gas phase flowing in from the evaporator 23 and discharges the working fluid in the gas phase to the condenser 21. Specifically, the compressor 3A is a reciprocating compressor in which a first piston 542 and a second piston 543 explained below reciprocate to thereby compress the working fluid in the gas phase. The compressor 3A includes, as shown in FIG. 2, a driving device 4 and a positive displacement machine 5A.

In the following explanation, two directions orthogonal to each other are represented as a +X direction and a +Y direction. The +X direction is a direction extending along the rotation axis of a first shaft member 511 explained below and from the first shaft member 511 to a second shaft member 512. That is, the +X direction is the right direction in a drawing view of FIG. 2. The +Y direction is a direction extending in a reciprocating direction of a slide member 54A explained below and from the second piston 543 to the first piston 542 included in the slide member 54A. That is, the +Y direction is the upward direction in the drawing view of FIG. 2. The +Y direction is a direction crossing the rotation axis. Further, the opposite direction of the +X direction is represented as a −X direction. The opposite direction of the +Y direction is represented as a −Y direction. That is, the −X direction is the left direction and the −Y direction is the downward direction in the drawing view of FIG. 2.

Configuration of the Driving Device

The driving device 4 rotates a shaft member 51 included in the positive displacement machine 5A centering on the rotation axis extending in the +X direction. The driving device 4 includes a first driving device 41 and a second driving device 42.

The first driving device 41 is provided in the −X direction with respect to the positive displacement machine 5A. The first driving device 41 rotates the first shaft member 511 included in the positive displacement machine 5A centering on a rotation axis Rx1 extending in the +X direction.

The second driving device 42 is provided in the +X direction with respect to the positive displacement machine 5A. The second driving device 42 rotates, in the opposite direction of the rotating direction of the first shaft member 511, the second shaft member 512 included in the positive displacement machine 5A centering on a rotation axis Rx2 extending in the +X direction.

The first driving device 41 and the second driving device 42 are configured by motors in this embodiment. However, the driving devices 41 and 42 may be configured by driving devices other than the motors.

Configuration of the Positive Displacement Machine

The positive displacement machine 5A is driven by the driving device 4, compresses the working fluid in the gas phase flowing in from the evaporator 23, and discharges the compressed working fluid in the gas phase. The positive displacement machine 5A includes the shaft member 51, a rotating member 52, a coupling member 53A, a slide member 54A, a case 55, first sealing members 56, second sealing members 57, and a rocking absorbing mechanism 58.

Configuration of the Shaft Member

The shaft member 51 is coupled to the driving device 4, rotated centering on the rotation axis extending in the +X direction, and rotates the rotating member 52. The shaft member 51 includes the first shaft member 511 and the second shaft member 512.

The first shaft member 511 is a shaft member disposed in the −X direction. The first shaft member 511 is rotated centering on the rotation axis Rx1 extending in the +X direction by the first driving device 41 and rotates a first rotating member 521 of the rotating member 52.

The second shaft member 512 is a shaft member disposed in the +X direction. The second shaft member 512 is rotated centering on the rotation axis Rx2 extending in the +X direction by the second driving device 42 and rotates a second rotating member 522 of the rotating member 52.

A extension line of the rotation axis Rx1 of the first shaft member 511 and an extension line of the rotation axis Rx2 of the second shaft member 512 coincide with each other.

Configuration of the Rotating Member

The rotating member 52 is a crank that is coupled to the shaft member 51 and rotates centering on the rotation axis of the shaft member 51. The rotating member 52 includes the first rotating member 521 and the second rotating member 522.

The first rotating member 521 is coupled to the first shaft member 511 and the coupling member 53A and rotates coaxially with the first shaft member 511 together with the first shaft member 511. That is, the first rotating member 521 rotates centering on the rotation axis Rx1 together with the first shaft member 511. The first rotating member 521 includes a semicircular first weight CW1, a hole 5211, and a spherical bearing 5212.

The weight CW1 is a counterweight for reducing vibration caused by a reciprocating motion of the slide member 54A in the +Y direction. The first weight CW1 is provided in the first rotating member 521 to be located in the −Y direction with respect to the rotation axis Rx1 when the slide member 54A slide in the +Y direction most, that is, the slide member 54A slides to the top dead point. In other words, the first weight CW1 is provided in the first rotating member 521 to be located in the +Y direction with respect to the rotation axis Rx1 when the slide member 54A slides in the −Y direction most, that is, the slide member 54A slides to the bottom dead point.

The hole 5211 pierces through the first rotating member 521 in the +X direction. The spherical bearing 5212 is provided in the hole 5211. An end portion 531 of the coupling member 53A in the −X direction is inserted into the inside of the spherical bearing 5212.

The second rotating member 522 is coupled to the second shaft member 512 and the coupling member 53A and rotates coaxially with the second shaft member 512 together with the second shaft member 512. That is, the second rotating member 522 rotates centering on the rotation axis Rx2 together with the second shaft member 512. The second rotating member 522 includes a semicircular second weight CW2, a hole 5221, and a spherical bearing 5222.

Like the first weight CW1, the second weight CW2 is a counterweight for reducing vibration caused by the reciprocating motion of the slide member 54A in the +Y direction. The second weight CW2 is provided in the second rotating member 522 to be located in the −Y direction with respect to the rotation axis Rx2 when the slide member 54A slides to the top dead point and located in the +Y direction with respect to the rotation axis Rx2 when the slide member 54A slides to the bottom dead point.

The hole 5221 pierces through the second rotating member 522 in the +X direction. An end portion 532 of the coupling member 53A in the +X direction is inserted into the hole 5221.

Configuration of the Coupling Member

The coupling member 53A is coupled to the rotating member 52 and moves in a direction crossing the rotation axis of the shaft member 51 according to rotation of the rotating member 52. That is, the coupling member 53A is an arm member that couples the rotating member 52 and the slide member 54A and converts a rotational motion of the rotating member 52 into a linear motion of the slide member 54A.

The end portion 531 of the coupling member 53A in the −X direction is inserted into the spherical bearing 5212 of the first rotating member 521. Similarly, the end portion 532 of the coupling member 53A in the +X direction is inserted into the spherical bearing 5222 of the second rotating member 522. When the coupling member 53A is inserted into the holes 5211 and 5221, the coupling member 53A is disposed in the +X direction. The coupling member 53A reciprocates in the +Y direction according to a rotational motion of the first rotating member 521 and the second rotating member 522 that rotate in opposite directions each other.

Although not illustrated, when moving in the +Y direction or the −Y direction according to the rotation of the rotating members 521 and 522, the coupling member 53A is turned centering on an axis extending in the +Y direction clockwise or counterclockwise when viewed from the +Y direction. Specifically, when the coupling member 53A located at the bottom dead point is moved in the +Y direction according to the rotation of the rotating members 521 and 522, the coupling member 53A is turned in one direction of the clockwise direction and the counterclockwise direction when viewed from the +Y direction until reaching half of a moving range in the +Y direction. The coupling member 53A is turned in the other direction of the clockwise direction and the counterclockwise direction when viewed from the +Y direction until reaching the top dead point from the half position of the moving range in the +Y direction. When the coupling member 53A located at the top dead point is moved in the −Y direction according to the rotation of the rotating members 521 and 522, the coupling member 53A is turned in the other direction of the clockwise direction and the counterclockwise direction when viewed from the +Y direction until reaching half of a moving range in the −Y direction. The coupling member 53A is turned in one direction of the clockwise direction and the counterclockwise direction when viewed from the +Y direction until reaching the bottom dead point from the half position of the moving range in the −Y direction. In this way, when reciprocating in the +Y direction, the coupling member 53A rocks clockwise or counterclockwise when viewed from the +Y direction centering on the axis extending in the +Y direction.

In contrast, in this embodiment, the rocking absorbing mechanism 58 is provided between the coupling member 53A and the slide member 54A. Consequently, whereas the coupling member 53A and the slide member 54A integrally reciprocate in the +Y direction, the slide member 54A is prevented from turning centering on the axis extending in the +Y direction integrally with the coupling member 53A. That is, the slide member 54A is capable of turning, with the rocking absorbing mechanism 58, centering on the axis extending in the +Y direction independently from the coupling member 53A. Such a configuration of the rocking absorbing mechanism 58 is explained in detail below.

Configuration of the Slide Member

The slide member 54A is coupled to the coupling member 53A and reciprocates in the +Y direction integrally with the coupling member 53A. That is, the slide member 54A slides in the +Y direction, which is a direction crossing the rotation axes Rx1 and Rx2. The slide member 54A includes a rod 541, a first piston 542, and a second piston 543.

The rod 541 is equivalent to the shaft and is a shaft-like member extending in the +Y direction and coupled to the coupling member 53A. The rod 541 includes a flange 5411 substantially in the center in the +Y direction.

The flange 5411 is a portion projecting to the radial direction outer side of the rod 541 from the outer surface of the rod 541. Although not illustrated, the flange 5411 is formed in a substantially circular shape when viewed from the +Y direction. The rocking absorbing mechanism 58 is provided between the flange 5411 and the coupling member 53A. The rocking absorbing mechanism 58 is explained in detail below.

The first piston 542 is provided at the end portion of the rod 541 in the +Y direction. The first piston 542 has an outer diameter larger than the outer diameter of the rod 541. The first piston 542 is disposed in a first guide part 552 configuring the case 55. When the rod 541 reciprocates in the +Y direction, the rod 541 reciprocates in the +Y direction in the first guide part 552. The first piston 542 includes a channel 5421, a suction valve 5422, and a piston seal 5423.

The channel 5421 pierces through the first piston 542 in the +Y direction. The channel 5421 supplies the working fluid in the gas phase to a first pressure chamber S2, which is a space in the +Y direction with respect to the first piston 542 on the inside of the first guide part 552. A space in the −Y direction with respect to the first piston 542 on the inside of the first guide part 552 is a first working chamber S3.

The suction valve 5422 opens when the pressure in the first pressure chamber S2 becomes lower than the pressure in the first working chamber S3 and causes the working fluid in the gas phase to flow into the first pressure chamber S2 via the channel 5421. The suction valve 5422 is closed when the pressure in the first pressure chamber S2 becomes higher than the pressure in the first working chamber S3.

Such a first piston 542 reduces the volume of the first pressure chamber S2 when sliding in the +Y direction. Consequently, the first piston 542 compresses the working fluid in the gas phase flowing into the first pressure chamber S2. The working fluid in the gas phase is an example of the gas.

The piston seal 5423 is formed in a ring shape and provided on the outer circumferential surface of the first piston 542. The piston seal 5423 comes into contact with the inner wall of the first guide part 552. The piston seal 5423 is deformed by pressure in the −Y direction generated according to approach of the first piston 542 to the top dead point and seals a space between the outer circumferential surface of the first piston 542 and the inner wall of the first guide part 552. Consequently, the working fluid in the gas phase in the first pressure chamber S2 is prevented from flowing out in the −Y direction between the outer circumferential surface of the first piston 542 and the inner wall of the first guide part 552 to lower the pressure in the first pressure chamber S2.

The second piston 543 is provided at the end portion of the rod 541 in the −Y direction. The second piston 543 has an outer diameter larger than the outer diameter of the rod 541. The second piston 543 is disposed in a second guide part 554 configuring the case 55. When the rod 541 reciprocates in the +Y direction, the second piston 543 reciprocates in the +Y direction in the second guide part 554. The second piston 543 includes a channel 5431, a suction valve 5432, and a piston seal 5433 that are the same as the channel 5421, the suction valve 5422, and the piston seal 5423 of the first piston 542.

When sliding in the −Y direction, such a second piston 543 reduces the volume of a second pressure chamber S4. Consequently, the second piston 543 compresses the working fluid in the gas phase flowing into the second pressure chamber S4. As explained above, the working fluid in the gas phase is an example of the gas.

Configuration of the Case

The case 55 is a housing that houses main components of the positive displacement machine 5A. The case 55 includes a housing part 551, a first guide part 552, a first segmentation part 553, a second guide part 554, and a second segmentation part 555.

Configuration of the Housing Part

The housing part 551 configures a mechanism chamber S1 on the inside. That is, the housing part 551 houses, in the mechanism chamber S1, a part of the shaft member 51, the rotating member 52, the coupling member 53A, a part of the slide member 54A, and the first sealing members 56 and the second sealing members 57. Specifically, the end portion of the first shaft member 511 in the +X direction, the end portion of the second shaft member 512 in the −X direction, the first rotating member 521, the second rotating member 522, the coupling member 53A, the center section of the rod 541 in the +Y direction, the first sealing members 56, and the second sealing members 57 are housed on the inside of the mechanism chamber S1.

The mechanism chamber S1 includes a lubricant on the inside. In this embodiment, an amount of the lubricant is approximately half of the volume of the mechanism chamber S1. However, the amount of the lubricant is not limited to this and can be changed as appropriate.

Configuration of the First Guide Part

The first guide part 552 is formed in a cylindrical shape and projects in the +Y direction from the housing part 551. The first piston 542 is disposed on the inside of the first guide part 552. The first guide part 552 guides a reciprocating motion in the +Y direction of the first piston 542.

The first guide part 552 configures the first pressure chamber S2 and the first working chamber S3.

The first pressure chamber S2 is a space in the +Y direction with respect to the first piston 542 in a space on the inside of the first guide part 552. That is, the first pressure chamber S2 is a space provided in the first guide part 552, the volume of the space changing according to slide of the first piston 542.

The first working chamber S3 is a space in the −Y direction with respect to the first piston 542 in the space on the inside of the first guide part 552 and is coupled to the mechanism chamber S1. That is, the first working chamber S3 is a space provided between the mechanism chamber S1 and the first pressure chamber S2 on the inside of the first guide part 552 and divided from the first pressure chamber S2 by the first piston 542. A space between the mechanism chamber S1 and the first working chamber S3 is sealed by the second sealing members 57 disposed in a disposition part 5532 explained below.

The first guide part 552 includes a first partition wall 5521, a first discharge valve 5523, and a first outflow part 5524.

The first partition wall 5521 segments the first pressure chamber S2 into a first suction chamber S21, which is a space in the −Y direction, and a first high pressure chamber S22, which is a space in the +Y direction. A through-hole 5522 piercing through the first partition wall 5521 in the +Y direction is provided in the first partition wall 5521. The first suction chamber S21 and the first high pressure chamber S22 communicate via the through-hole 5522. The working fluid in the gas phase is supplied to the first suction chamber S21 from the first working chamber S3 via the channel 5421 of the first piston 542.

The first discharge valve 5523 opens when the pressure in the first suction chamber S21 is higher than the pressure in the first high pressure chamber S22.

The first outflow part 5524 is provided in a portion on the first high pressure chamber S22 side in the first guide part 552. The first outflow part 5524 is coupled to the first pipe 241 (see FIG. 1).

A part of the working fluid in the gas phase supplied from the fourth pipe 244 flows into a space in the first guide part 552 and is supplied into the first suction chamber S21 via the channel 5421 and the suction valve 5422 according to a reciprocating motion of the first piston 542. Thereafter, the working fluid in the gas phase flows into the first high pressure chamber S22 from the first suction chamber S21 via the first discharge valve 5523 while being compressed by the first piston 542 and flows out to the first pipe 241 from the first outflow part 5524.

Configuration of the First Segmentation Part

The first segmentation part 553 is a segmentation part that is provided in a coupling portion of the housing part 551 and the first guide part 552 and segments the mechanism chamber S1 and the first working chamber S3. The first segmentation part 553 is provided in a portion on the housing part 551 side in the first guide part 552 and projects in the inner diameter direction of the first guide part 552. The first segmentation part 553 includes a communication hole 5531 and a disposition part 5532.

The communication hole 5531 pierces through the first segmentation part 553 in the +Y direction. The rod 541 of the slide member 54A is inserted through the communication hole 5531 in the +Y direction. That is, the first working chamber S3 is connected to the mechanism chamber S1 via the communication hole 5531.

The disposition part 5532 is a portion where the second sealing members 57 are disposed in the first segmentation part 553. The second sealing members 57 are explained in detail below.

Configuration of the Second Guide Part

The second guide part 554 is formed in a cylindrical shape and projects in the −Y direction from the housing part 551. The second piston 543 is disposed on the inside of the second guide part 554. The second guide part 554 guides a reciprocating motion in the +Y direction of the second piston 543.

The second guide part 554 configures the second pressure chamber S4 and a second working chamber S5.

The second pressure chamber S4 is a space in the −Y direction with respect to the second piston 543 in a space on the inside of the second guide part 554. That is, the second pressure chamber S4 is a space provided in the second guide part 554, the volume of the space changing according to slide of the second piston 543.

The second working chamber S5 is a space in the +Y direction with respect to the second piston 543 in the space on the inside of the second guide part 554 and is coupled to the mechanism chamber S1. That is, the second working chamber S5 is a space provided between the mechanism chamber S1 and the second pressure chamber S4 on the inside of the second guide part 554 and divided from the second pressure chamber S4 by the second piston 543. A space between the mechanism chamber S1 and the second working chamber S5 is sealed by the second sealing members 57 disposed in a disposition part 5552 explained below.

The second guide part 554 includes a second partition wall 5541, a second discharge valve 5543, and a second outflow part 5544 that are the same as the first partition wall 5521, the first discharge valve 5523, and the first outflow part 5524 of the first guide part 552.

The second partition wall 5541 segments the second pressure chamber S4 into a second suction chamber S41, which is a space in the +Y direction, and a second high pressure chamber S42, which is a space in the −Y direction. A through-hole 5542 piercing through the second partition wall 5541 in the +Y direction is provided in the second partition wall 5541. The second suction chamber S41 and the second high pressure chamber S42 communicate via the through-hole 5542. The working fluid is supplied to the second suction chamber S41 from the second working chamber S5 via the channel 5431 of the second piston 543.

The second discharge valve 5543 opens when the pressure in the second suction chamber S41 becomes higher than the pressure in the second high pressure chamber S42.

The second outflow part 5544 is provided in a portion on the second high pressure chamber S42 side in the second guide part 554. The second outflow part 5544 is coupled to the first pipe 241.

Another part of the working fluid in the gas phase supplied from the fourth pipe 244 flows into a space in the second guide part 554 and is supplied into the second suction chamber S41 via the channel 5431 and the suction valve 5432 by a reciprocating motion of the second piston 543. Thereafter, the working fluid in the gas phase flows into the second high pressure chamber S42 from the second suction chamber S41 via the second discharge valve 5543 while being compressed by the second piston 543 and flows out to the first pipe 241 from the second outflow part 5544.

Configuration of the Second Segmentation Part

The second segmentation part 555 is a segmentation part that is provided in a coupling portion of the housing part 551 and the second guide part 554 and segments the mechanism chamber S1 and the second working chamber S5. The second segmentation part 555 is provided in a portion on the housing part 551 side in the second guide part 554 and projects in the inner diameter direction of the second guide part 554. The second segmentation part 555 includes a communication hole 5551 and a disposition part 5552.

The communication hole 5551 pierces through the second segmentation part 555 in the +Y direction. The rod 541 of the slide member 54A is inserted through the communication hole 5551 in the +Y direction. That is, the second working chamber S5 is connected to the mechanism chamber S1 via the communication hole 5551.

The disposition part 5552 is a portion where the second sealing members 57 are disposed in the second segmentation part 555. The second sealing members 57 are explained in detail below.

Configuration of the First Sealing Members

The first sealing members 56 are members that hinder movement of the lubricant. Specifically, the first sealing members 56 are ring-like oil seals that seal the inside of the mechanism chamber S1 and restrict the lubricant encapsulated in the mechanism chamber S1 from moving to the outside of the mechanism chamber S1. As shown in FIG. 2, two first sealing members 56 are provided in the positive displacement machine 5A. For convenience of explanation, one first sealing member 56 of the two first sealing members 56 is represented as a first sealing member 56A and the other first sealing member 56 is represented as a first sealing member 56B.

The first sealing member 56A is a ring-like member disposed between the inner wall of the mechanism chamber S1 and the first shaft member 511 of the shaft member 51 and is formed by an elastic material such as rubber. Specifically, the first sealing member 56A is disposed to surround the first shaft member 511 in the circumferential direction of the first shaft member 511 between the inner wall in the −X direction and the first shaft member 511 in the mechanism chamber S1. The first sealing member 56A is fixed to the inner wall of the mechanism chamber S1. The inner side end portion of the first sealing member 56A is coupled to the outer circumferential surface of the first shaft member 511.

Like the first sealing member 56A, the first sealing member 56B is a ring-like member disposed between the inner wall of the mechanism chamber S1 and the second shaft member 512 of the shaft member 51 and is formed by an elastic material such as rubber. Specifically, the first sealing member 56B is disposed to surround the second shaft member 512 in the circumferential direction of the second shaft member 512 between the inner wall in the +X direction and the second shaft member 512 in the mechanism chamber S1. The first sealing member 56B is fixed to the inner wall of the mechanism chamber S1. The inner side end portion of the first sealing member 56B is coupled to the outer circumferential surface of the second shaft member 512.

Configuration of the Second Sealing Members

The second sealing members 57 are members that hinder movement of the lubricant. Specifically, the second sealing members 57 seal the mechanism chamber 51 and restrict the lubricant encapsulated in the mechanism chamber 51 from moving to the outside of the mechanism chamber 51. Two second sealing members 57 are provided in the compressor 3A. For convenience of explanation, one second sealing member 57 of the two second sealing members 57 is represented as a second sealing member 57A and the other second sealing member 57 is represented as a second sealing member 57B.

The second sealing member 57A is a ring-like member disposed between the inner wall of the mechanism chamber 51 and the slide member 54A and is formed by an elastic member such as rubber. The second sealing member 57A is provided in the disposition part 5532 of the first segmentation part 553. Specifically, the second sealing member 57A is a ring-like oil seal provided in the +Y direction in the mechanism chamber 51 and disposed to surround the rod 541 in the circumferential direction of the rod 541 between the inner wall surrounding the rod 541 of the slide member 54A and the rod 541. The second sealing member 57A is fixed to the inner wall of the mechanism chamber S1.

The second sealing member 57B is a ring-like member disposed between the inner wall of the mechanism chamber S1 and the slide member 54A and is formed by an elastic material such as rubber. The second sealing member 57B is provided in the disposition part 5552 of the second segmentation part 555. Specifically, the second sealing member 57B is a ring-like oil seal provided in the −Y direction in the mechanism chamber S1 and disposed to surround the rod 541 in the circumferential direction of the rod 541 between the inner wall surrounding the rod 541 and the rod 541. The second sealing member 57B is fixed to the inner wall of the mechanism chamber S1.

Since the first sealing member 56A is provided, the lubricant is restricted from moving in the −X direction between the outer circumferential surface of the first shaft member 511 and the first sealing member 56A fixed to the inner wall of the mechanism chamber S1. Since the first sealing member 56B is provided, the lubricant is restricted from moving in the +X direction between the outer circumferential surface of the second shaft member 512 and the first sealing member 56B fixed to the inner wall of the mechanism chamber S1.

Since the second sealing member 57A is provided, the lubricant is restricted from moving in the +Y direction between the outer circumferential surface of the rod 541 and the second sealing member 57A fixed to the inner wall of the mechanism chamber S1. Since the second sealing member 57B is provided, the lubricant is restricted from moving in the −Y direction between the outer circumferential surface of the rod 541 and the second sealing member 57B fixed to the inner wall of the mechanism chamber S1.

In this way, a route in which the lubricant leaks to the outside from the mechanism chamber S1 is sealed by the first sealing members 56 and the second sealing members 57. Consequently, even when use postures of the positive displacement machine 5A and the compressor 3A tilt, the lubricant can be kept in the mechanism chamber S1. Therefore, it is possible to maintain a state in which driving members in the mechanism chamber S1 are lubricated by the lubricant, that is, a state in which the rotating member 52, the coupling member 53A, and the slide member 54A are lubricated.

Configuration of the Rocking Absorbing Mechanism

The rocking absorbing mechanism 58 absorbs a rocking motion of the first piston 542 and the second piston 543 centering on the rod 541. That is, even when the coupling member 53A is swung centering on the axis extending in the +Y direction, the rocking absorbing mechanism 58 absorbs rocking of the slide member 54A coupled to the coupling member 53A and, when the slide member 54A reciprocates in the +Y direction, prevents the first piston 542 and the second piston 543 from rocking centering on the axis extending in the +Y direction. In other words, the rocking absorbing mechanism 58 is provided between the coupling member 53A and the rod 541 of the slide member 54A and allows one of the coupling member 53A and the rod 541 to rocking with respect to the other of the coupling member 53A and the rod 541 centering on the axis extending in the +Y direction.

Figure 3:
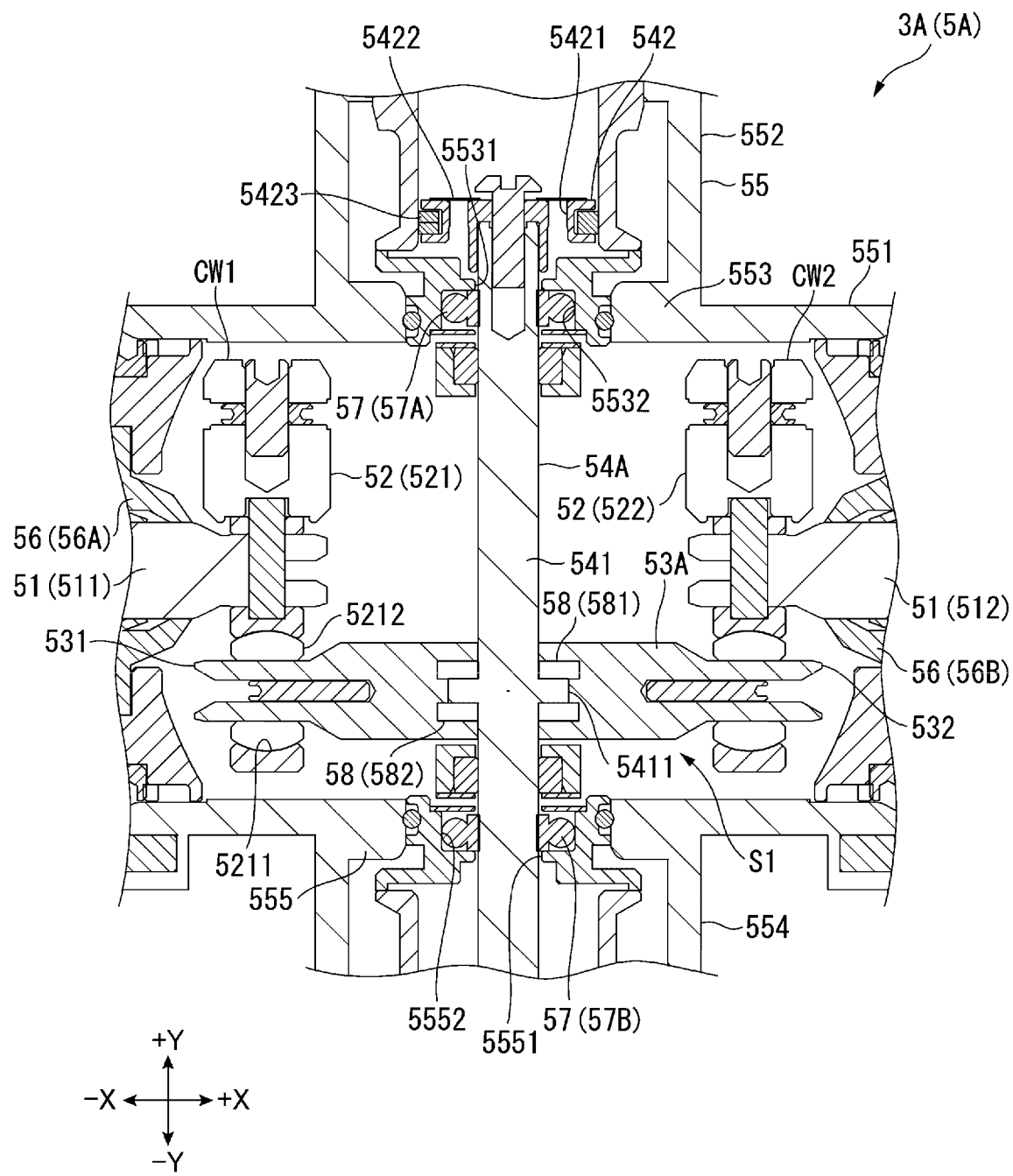
FIG. 3 is a sectional view enlarging and showing a part of the compressor according to the first embodiment.

FIG. 3 is a sectional view showing the configuration of the rocking absorbing mechanism 58.

The rocking absorbing mechanism 58 includes, as shown in FIGS. 2 and 3, a first rocking absorbing mechanism 581 and a second rocking absorbing mechanism 582. The first rocking absorbing mechanism 581 and the second rocking absorbing mechanism 582 are provided on the inside of the coupling member 53A and coupled to each of the coupling member 53A and the rod 541.

The first rocking absorbing mechanism 581 is configured by a sliding bearing provided in the +Y direction with respect to the flange 5411.

The sliding bearing configuring the first rocking absorbing mechanism 581 is formed in a ring shape when viewed from the +Y direction. The sliding bearing includes a through-hole through which the rod 541 pierces in the +Y direction. Although not illustrated in detail, the sliding bearing includes a fixed component and a moving component capable of sliding with respect to the fixed component. The fixed component is coupled to one of the coupling member 53A and the flange 5411. The moving component is coupled to the other of the coupling member 53A and the flange 5411.

The second rocking absorbing mechanism 582 is configured by a sliding bearing provided in the −Y direction with respect to the flange 5411 of the rod 541.

The sliding bearing configuring the second rocking absorbing mechanism 582 is the same sliding bearing as the sliding bearing configuring the first rocking absorbing mechanism 581. Specifically, the sliding bearing configuring the second rocking absorbing mechanism 582 is formed in a ring shape when viewed from the −Y direction. The sliding bearing includes a through-hole through which the rod 541 pierces in the +Y direction. The fixed component of the sliding bearing is coupled to one of the coupling member 53A and the flange 5411. The moving component of the sliding bearing is coupled to the other of the coupling member 53A and the flange 5411.

With such a rocking absorbing mechanism 58, one of the coupling member 53A and the rod 541 is allowed to turn with respect to the other of the coupling member 53A and the rod 541. Accordingly, even when the first rotating member 521 and the second rotating member 522 rotate in opposite directions each other centering on the rotation axes Rx1 and Rx2 and the coupling member 53A rocks centering on the axis extending in the +Y direction, the rod 541 is prevented from rocking coaxially with the coupling member 53A integrally with the coupling member 53A. Consequently, the first piston 542 is prevented from turning, along the inner circumferential surface of the first guide part 552, centering on the axis extending in the +Y direction. The second piston 543 is prevented from rocking, along the inner circumferential surface of the second guide part 554, centering on the axis extending in the +Y direction.

Therefore, wear is prevented from occurring between the first piston 542 and the inner circumferential surface of the first guide part 552. Wear is prevented from occurring between the second piston 543 and the inner circumferential surface of the second guide part 554. For example, wear of the piston seal 5423 of the first piston 542 and wear of the piston seal 5433 of the second piston 543 can be suppressed.

At least one rocking absorbing mechanism of the first rocking absorbing mechanism 581 and the second rocking absorbing mechanism 582 may be configured by, for example, a rolling bearing.

Effects of the First Embodiment

The electronic apparatus 1 according to this embodiment explained above achieves the following effects.

The electronic apparatus 1 includes the cooling device 2.

The cooling device 2 includes the compressor 3A, the condenser 21, the expander 22, and the evaporator 23. The compressor 3A compresses the working fluid in the gas phase. The condenser 21 condenses the working fluid in the gas phase compressed by the compressor 3A into the working fluid in the liquid phase. The expander 22 decompresses the working fluid in the liquid phase condensed by the condenser 21 and changes the state of the working fluid to the state in which the liquid phase and the gas phase are mixed. The evaporator 23 is connected to the cooling target CT to be capable of transferring heat. The evaporator 23 changes the working fluid flowing from the expander 22 to the working fluid in the gas phase with the heat transferred from the cooling target CT and discharges the changed working fluid in the gas phase to the compressor 3A.

The compressor 3A includes the positive displacement machine 5A and the driving device 4 that rotates the rotating member 52 of the positive displacement machine 5A. The first piston 542 and the second piston 543 of the positive displacement machine 5A compresses the working fluid in the gas phase flowing into the pressure chambers S2 and S4. The first piston 542 and the second piston 543 are equivalent to the piston and the working fluid in the gas phase is equivalent to the gas.

The positive displacement machine 5A includes the first guide part 552, the second guide part 554, the rotating member 52, the coupling member 53A, the slide member 54A, the first pressure chamber S2, and the rocking absorbing mechanism 58.

The first guide part 552 and the second guide part 554 are tubular guide parts and configure the case 55. The rotating member 52 rotates centering on the rotation axis extending in the +X direction. The coupling member 53A is coupled to the rotating member 52 and moves in a ±Y direction crossing the rotation axis of the rotating member 52 according to the rotation of the rotating member 52. The slide member 54A includes the rod 541 extending in the +Y direction, the first piston 542 provided at the end portion of the rod 541 in the +Y direction and disposed in the first guide part 552, and the second piston 543 provided at the end portion of the rod 541 in the −Y direction and disposed in the second guide part 554. The rod 541 is equivalent to the shaft. The first piston 542 and the second piston 543 are equivalent to the piston. The slide member 54A is coupled to the coupling member 53A and slides in the +Y direction. The first pressure chamber S2 is provided in the first guide part 552 and the volume of the first pressure chamber S2 changes according to the slide of the first piston 542. The second pressure chamber S4 is provided in the second guide part 554 and the volume of the second pressure chamber S4 changes according to the slide of the second piston 543.

The rocking absorbing mechanism 58 absorbs the rocking motion of the first piston 542 and the rocking motion of the second piston 543 centering on the axis extending in the +Y direction. In other words, when the coupling member 53A is swung centering on the axis extending in the +Y direction, the rocking absorbing mechanism 58 prevents the first piston 542 and the second piston 543 from rocking together with the coupling member 53A centering on the axis extending in the +Y direction. The rocking absorbing mechanism 58 is provided between the coupling member 53A and the rod 541.

With such a configuration, when the positive displacement machine 5A operates, it is possible to suppress rocking of the first piston 542 with respect to the inner wall of the first guide part 552 and rocking of the second piston 543 with respect to the inner wall of the second guide part 554. Consequently, the first piston 542 rocks with respect to the inner wall of the first guide part 552 centering on the axis extending in the +Y direction. It is possible to suppress wear that occurs between the first piston 542 and the inner wall of the first guide part 552. Similarly, the second piston 543 rocks with respect to the inner wall of the second guide part 554 centering on the axis extending in the +Y direction. It is possible to suppress wear that occurs between the second piston 543 and the inner wall of the second guide part 554. Therefore, it is possible to extend the life of the positive displacement machine 5A. Consequently, it is possible to extend the life of the compressor 3A and extend the life of the cooling device 2 and the electronic apparatus 1.

In the positive displacement machine 5A, the rocking absorbing mechanism 58 is provided between the coupling member 53A and the rod 541 and allows one of the coupling member 53A and the rod 541 to rock with respect to the other of the coupling member 53A and the rod 541 centering on the axis extending in the +Y direction.

With such a configuration, even when the coupling member 53A moves in the ±Y direction according to the rotation of the rotating member 52 and rocks centering on the axis extending in the +Y direction, it is possible to prevent the rod 541 from rocking together with the coupling member 53A while sliding the rod 541 coupled to the coupling member 53A in the ±Y direction. Accordingly, it is possible to prevent the first piston 542 provided at the end portion of the rod 541 from rocking, along the inner wall of the first guide part 552, centering on the axis extending in the +Y direction. Similarly, it is possible to prevent the second piston 543 provided at the end portion of the rod 541 from rocking, along the inner wall of the second guide part 554, centering on the axis extending in the +Y direction. Therefore, it is possible to suppress wear that occurs between the first piston 542 and the inner wall of the first guide part 552 and wear that occurs between the second piston 543 and the inner wall of the second guide part 554. Therefore, it is possible to extend the life of the positive displacement machine 5A.

In the positive displacement machine 5A, the first rocking absorbing mechanism 581 and the second rocking absorbing mechanism 582 of the rocking absorbing mechanism 58 is configured by the sliding bearings.

With such a configuration, the rocking absorbing mechanism 58 can be simply configured. Therefore, it is possible to prevent the configuration of the positive displacement machine 5A from being complicated.

When the rocking absorbing mechanism 58 is configured by a rolling bearing as well, the rocking absorbing mechanism 58 can be simply configured.

The positive displacement machine 5A includes the shaft member 51 that rotates the rotating member 52 centering on the rotation axes Rx1 and Rx2. The shaft member 51 includes the first shaft member 511 and the second shaft member 512. The second shaft member 512 is disposed on the opposite side of the first shaft member 511 across the slide member 54A and rotates in the opposite direction of the rotating direction of the first shaft member 511. The rotating member 52 includes the first rotating member 521 and the second rotating member 522. The first rotating member 521 is coupled to the first shaft member 511 and the coupling member 53A and rotates coaxially with the first shaft member 511. The second rotating member 522 is coupled to the second shaft member 512 and the coupling member 53A and rotates coaxially with the second shaft member 512.

With such a configuration, the first rotating member 521 coupled to the first shaft member 511 and the second rotating member 522 coupled to the second shaft member 512 rotate in opposite directions each other. Consequently, it is possible to reduce vibration of the positive displacement machine 5A at the time when the slide member 54A coupled to the coupling member 53A coupled to the first rotating member 521 and the second rotating member 522 slides.

In such a configuration of the positive displacement machine 5A, according to the rotations of the first rotating member 521 and the second rotating member 522 in the opposite directions, the coupling member 53A reciprocates in the +Y direction and is swung centering on the axis extending in the +Y direction. In contrast, since the positive displacement machine 5A includes the rocking absorbing mechanism 58, it is possible to suppress rocking of the first piston 542 with respect to the inner wall of the first guide part 552 and rocking of the second piston 543 with respect to the inner wall of the second guide part 554. Therefore, it is possible to suppress wear that occurs between the first piston 542 and the inner wall of the first guide part 552 and wear that occurs between the second piston 543 and the inner wall of the second guide part 554 and extend the life of the positive displacement machine 5A and extend the life of the compressor 3A, the cooling device 2, and the electronic apparatus 1.

Second Embodiment

A second embodiment of the present disclosure is explained.

An electronic apparatus according to this embodiment has the same configuration as the configuration of the electronic apparatus according to the first embodiment but is different in disposition of a rocking absorbing mechanism. In the following explanation, the same or substantially the same portions as the portions explained above are denoted by the same reference numerals and signs and explanation of the portions is omitted.

Schematic Configurations of the Electronic Apparatus and a Cooling Device

Figure 4:
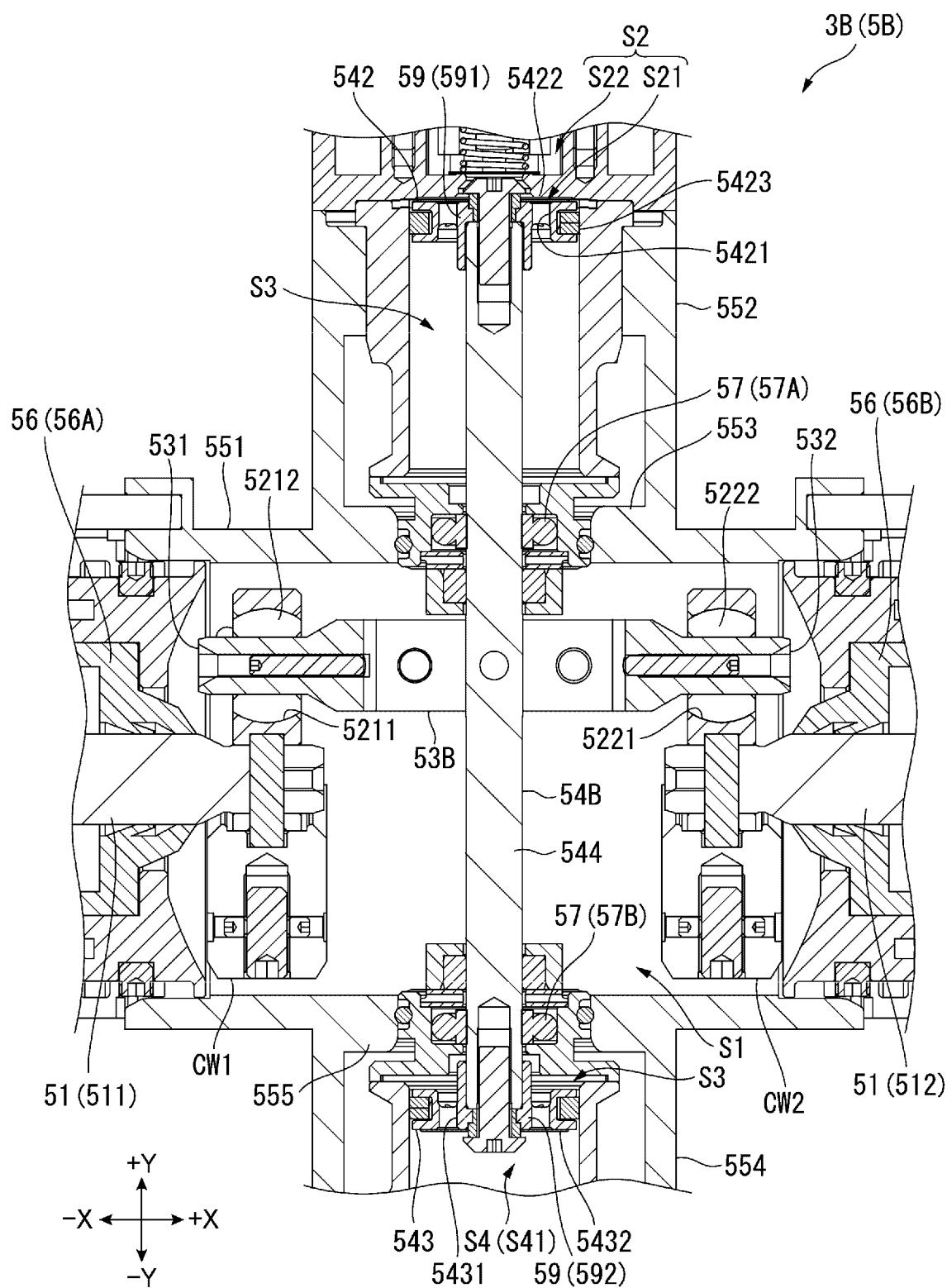
FIG. 4 is a sectional view enlarging and showing a part of a compressor included in an electronic apparatus according to a second embodiment.

FIG. 4 is a sectional view enlarging and showing a part of a compressor 3B included in the electronic apparatus according to this embodiment. That is, FIG. 4 is a sectional view of the compressor 3B showing disposition of a rocking absorbing mechanism 59.

The electronic apparatus according to this embodiment includes the same components and the same functions as the components and the functions of the electronic apparatus 1 according to the first embodiment except that the electronic apparatus includes the compressor 3B shown in FIG. 4 instead of the compressor 3A according to the first embodiment. That is, a cooling device included in the electronic apparatus according to this embodiment includes the same components and the same functions as the components and the functions of the cooling device 2 according to the first embodiment except that the cooling device includes the compressor 3B instead of the compressor 3A.

Configuration of the Compressor

Like the compressor 3A, the compressor 3B is a reciprocating compressor that compresses the working fluid in the gas phase flowing in from the evaporator 23 via the fourth pipe 244. The compressor 3B includes the driving device 4 and a positive displacement machine 5B.

The positive displacement machine 5B includes the same components and the same functions as the components and the functions of the positive displacement machine 5A according to the first embodiment except that the positive displacement machine 5B includes a coupling member 53B, a slide member 54B, and the rocking absorbing mechanism 59 instead of the coupling member 53A, the slide member 54A, and the rocking absorbing mechanism 58. That is, the positive displacement machine 5B includes the shaft member 51, the rotating member 52, the coupling member 53B, the slide member 54B, the case 55, the first sealing members 56, the second sealing members 57, and the rocking absorbing mechanism 59.

Like the coupling member 53A, the coupling member 53B is coupled to the rotating member 52 and moves in the +Y direction crossing the rotation axes Rx1 and Rx2 of the shaft member 51 according to rotation of the rotating member 52. That is, the coupling member 53B is an arm member that couples the rotating member 52 and the slide member 54B and converts a rotating motion of the rotating member 52 centering on the rotation axis Rx1 and Rx2 into a reciprocating motion of the slide member 54B in the +Y direction.

The end portion 531 of the coupling member 53B in the −X direction is inserted into the spherical bearing 5212 of the first rotating member 521. The end portion 532 of the coupling member 53B in the +X direction is inserted into the spherical bearing 5222 of the second rotating member 522. In this way, when the coupling member 53B is inserted into the holes 5211 and 5221, the coupling member 53B is disposed in the +X direction. The coupling member 53B reciprocates in the +Y direction according to rotating motions of the first rotating member 521 and the second rotating member 522 that rotate in opposite directions each other.

Unlike the inside of the coupling member 53A, the rocking absorbing mechanism 58 is not provided on the inside of the coupling member 53B. That is, a housing part in which the rocking absorbing mechanism 58 is disposed is not provided in the coupling member 53B.

The slide member 54B is coupled to the coupling member 53B and reciprocates in the +Y direction integrally with the coupling member 53B. That is, the slide member 54B reciprocates in the +Y direction, which is a direction crossing the rotation axes Rx1 and Rx2. The slide member 54B includes a rod 544, the first piston 542 provided at the end portion of the rod 544 in the +Y direction, and the second piston 543 provided at the end portion of the rod 544 in the −Y direction.

The rod 544 is equivalent to the shaft. Unlike the rod 541, the rod 544 does not include the flange 5411. The rod 544 is integrally coupled to the coupling member 53B. Accordingly, together with the coupling member 53B, the rod 544 reciprocates in the +Y direction and rocks centering on the axis extending in the +Y direction.

In this way, since the positive displacement machine 5B does not include the rocking absorbing mechanism 58, the positive displacement machine 5B includes the coupling member 53B and the slide member 54B. However, not only this, but the positive displacement machine 5B may include the coupling member 53A, the slide member 54A, and the rocking absorbing mechanism 58 instead of the coupling member 53B and the slide member 54B.

Configuration of the Rocking Absorbing Mechanism

Like the rocking absorbing mechanism 58, the rocking absorbing mechanism 59 absorbs rocking of the first piston 542 and the second piston 543 centering on the axis extending in the +Y direction and with respect to the rod 544. In other words, when the rod 544 is swung centering on the axis extending in the +Y direction, the rocking absorbing mechanism 59 prevents the first piston 542 and the second piston 543 from rocking together with the rod 544 centering on the axis extending in the +Y direction. The +Y direction is a direction crossing each of the rotation axes Rx1 and Rx2 of the shaft member 51.

The rocking absorbing mechanism 59 includes a first rocking absorbing mechanism 591 and a second rocking absorbing mechanism 592.

The first rocking absorbing mechanism 591 is provided between the rod 544 and the first piston 542 of the slide member 54B and allows one of the rod 544 and the first piston 542 to rock with respect to the other of the rod 544 and the first piston 542 centering on the axis extending in the +Y direction. The first rocking absorbing mechanism 591 is configured by a sliding bearing. Although not illustrated in detail, the sliding bearing configuring the first rocking absorbing mechanism 591 includes a cylindrical fixed component and a cylindrical moving component movable in the circumferential direction of the fixed component along the outer circumferential surface of the fixed component. One component of the fixed component and the moving component is fixed to the outer circumferential surface of the rod 544 and the other component is fixed to the first piston 542.

Accordingly, even when the rod 544 coupled to the coupling member 53B rocks centering on the axis extending in the +Y direction according to the rotation in the opposite directions of the first rotating member 521 and the second rotating member 522, the first piston 542 does not rock following the rocking of the rod 544. That is, even when the rod 544 rocks centering on the axis extending in the +Y direction, the first piston 542 does not rock together with the rod 544. Consequently, the first piston 542 does not rock centering on the axis extending in the +Y direction and reciprocates in the +Y direction. Therefore, it is possible to suppress wear from occurring between the first piston 542 and the inner wall of the first guide part 552. Accordingly, for example, it is possible to suppress deterioration due to the rocking of the first piston 542 from occurring in the piston seal 5423 provided on the outer circumferential surface of the first piston 542. Therefore, since deterioration of the positive displacement machine 5B can be suppressed, it is possible to extend the life of the positive displacement machine 5B and extend the life of the compressor 3B, the cooling device 2, and the electronic apparatus.

The second rocking absorbing mechanism 592 is provided between the rod 544 and the second piston 543 of the slide member 54B and allows one of the rod 544 and the second piston 543 to rock with respect to the other of the rod 544 and the second piston 543 centering on the axis extending in the +Y direction. The second rocking absorbing mechanism 592 is configured by the same sliding baring as the sliding bearing of the first rocking absorbing mechanism 591.

Accordingly, even when the rod 544 coupled to the coupling member 53B rocks centering on the axis extending in the +Y direction, the second piston 543 does not rock following the rocking of the rod 544. Consequently, since the second piston 543 reciprocates in +Y direction without rocking centering on the axis extending in the +Y direction, it is possible to suppress wear from occurring between the second piston 543 and the inner wall of the second guide part 554. Accordingly, for example, it is possible to suppress deterioration due to rock of the second piston 543 from occurring in the piston seal 5433 of the second piston 543. Therefore, since deterioration of the positive displacement machine 5B can be suppressed, it is possible to extend the life of the positive displacement machine 5B and extend the life of the compressor 3B, the cooling device 2, and the electronic apparatus.

At least one of the rocking absorbing mechanisms 591 and 592 may be configured by a rolling bearing.

Effects of the Second Embodiment

The electronic apparatus according to this embodiment explained above achieves the following effects besides achieving the same effects as the effects of the electronic apparatus 1 according to the first embodiment.

In the positive displacement machine 5B, the first rocking absorbing mechanism 591 of the rocking absorbing mechanism 59 is provided between the rod 544 and the first piston 542. The rod 544 is equivalent to the shaft. The first piston 542 is equivalent to the piston. The first rocking absorbing mechanism 591 allows one of the rod 544 and the first piston 542 to rock with respect to the other of the rod 544 and the first piston 542 centering on the axis extending in the +Y direction. The second rocking absorbing mechanism 592 of the rocking absorbing mechanism 59 is provided between the rod 544 and the second piston 543. The second piston 543 is equivalent to the piston. The second rocking absorbing mechanism 592 allows one of the rod 544 and the second piston 543 to rock with respect to the other of the rod 544 and the second piston 543 centering on the axis extending in the +Y direction.

With such a configuration, even when the rod 544 is swung together with the coupling member 53B centering on the axis extending in the +Y direction, it is possible to prevent the first piston 542 and the second piston 543 from being swung together with the rod 544 centering on the axis extending in the +Y direction. Therefore, it is possible to suppress wear that occurs between the first piston 542 and the inner wall of the first guide part 552 and wear that occurs between the second piston 543 and the inner wall of the second guide part 554. It is possible to extend the life of the positive displacement machine 5B and extend the life of the compressor 3B, the cooling device 2, and the electronic apparatus.

Modifications of the Embodiments

The present disclosure is not limited to the embodiments explained above. Modifications, improvements, and the like within a range in which the object of the present disclosure can be achieved are included in the present disclosure.

In the first embodiment, the rocking absorbing mechanism 58 is provided between the coupling member 53A and the rod 541 functioning as the shaft. In the second embodiment, the rocking absorbing mechanism 59 includes the first rocking absorbing mechanism 591 and the second rocking absorbing mechanism 592, the first rocking absorbing mechanism 591 is provided between the rod 544 and the first piston 542, and the second rocking absorbing mechanism 592 is provided between the rod 544 and the second piston 543.

However, not only this, but a rocking absorbing mechanism may be provided between the first piston 542 and the inner wall of the first guide part 552. For example, when the piston seal 5423 is not provided on the outer circumferential surface of the first piston 542 and a seal member that seals a space between the inner wall of the first guide part 552 and the outer circumferential surface of the first piston 542 is provided on the inner wall of the first guide part 552, the rocking absorbing mechanism may be provided between the seal member and the outer circumferential surface of the first piston 542.

For example, the rocking absorbing mechanism may be provided between the outer circumferential surface of the first piston 542 and the piston seal 5423 or may be provided between the outer circumferential surface of the second piston 543 and the piston seal 5433.

In these cases as well, it is possible to achieve the same effects as the effects of the positive displacement machines 5A and 5B according to the first and second embodiments.

In the first embodiment, each of the first rocking absorbing mechanism 581 and the second rocking absorbing mechanism 582 of the rocking absorbing mechanism 58 is configured by the sliding bearing or the rolling bearing. In the second embodiment, each of the first rocking absorbing mechanism 591 and the second rocking absorbing mechanism 592 of the rocking absorbing mechanism 59 is configured by the sliding bearing or the rolling bearing. However, not only this, but the configuration of the rocking absorbing mechanism may be a configuration other than the sliding bearing and the rolling bearing if the rocking absorbing mechanism can allow one of two members coupled by the rocking absorbing mechanism to rock with respect to the other of the two members centering on the axis extending in the +Y direction.

In the embodiments, the shaft member 51 includes the first shaft member 511 that is disposed in the −X direction with respect to the slide members 54A and 54B and rotates centering on the rotation axis Rx1 extending in the +X direction and the second shaft member 512 that is disposed in the +X direction with respect to the slide members 54A and 54B and rotates centering on the rotation axis Rx2 extending in the +X direction. The rotating member 52 includes the first rotating member 521 that is coupled to the first shaft member 511 and rotates coaxially with the first shaft member 511 and the second rotating member 522 that is coupled to the second shaft member 512 and rotates coaxially with the second shaft member 512. That is, the positive displacement machines 5A and 5B include the shaft members 511 and 512 and the rotating members 521 and 522. However, not only this, but the positive displacement machine according to the present disclosure may include one shaft member or may include one rotating member. In this case, the compressor according to the present disclosure may include one driving device.

For example, the compressor according to the present disclosure may include one driving device and one positive displacement machine. The one positive displacement machine may include a transmitting part such as a gear that transmits a rotating force of one shaft member rotated by the one driving device and rotate, with the transmitting part, two rotating members (for example, the first rotating member 521 and the second rotating member 522). In this case, manufacturing cost for the compressor can be reduced.

In the embodiments, the slide members 54A and 54B include the first piston 542 provided at the end portion in the +Y direction in the rods 541 and 544 and the second piston 543 provided at the end portion in the −Y direction in the rods 541 and 544. However, not only this, but the slide members 54A and 54B may include one piston. For example, when the slide members 54A and 54B do not include the second piston 543, the positive displacement machine may not include the second guide part 554, the second pressure chamber S4, and the second working chamber S5.

In the embodiments, the positive displacement machines 5A and 5B configure the compressors 3A and 3B in conjunction with the driving device 4. However, not only this, but the present disclosure may be applied to a positive displacement machine used in an internal combustion engine such as an engine. That is, the positive displacement machine according to the present disclosure is not limited to the positive displacement machine configuring the compressor.

In the embodiments, the compressors 3A and 3B compress the working fluid, the phase of which changes between the liquid phase and the gas phase. However, the gas compressed by the compressor according to the present disclosure is not limited to a working fluid functioning as a coolant. The compressors 3A and 3B configure the cooling device 2. However, not only this, but the compressor according to the present disclosure may configure another device or may be used alone.

Overview of the Present Disclosure

An overview of the present disclosure is noted below.

A positive displacement machine according to a first aspect of the present disclosure includes: a tubular guide part; a rotating member configured to rotate centering on a rotation axis; a coupling member coupled to the rotating member and configured to move according to the rotation of the rotating member in a direction crossing the rotation axis; a slide member including a shaft extending in the crossing direction and a piston provided at an end portion of the shaft in the crossing direction and disposed in the guide part, the slide member being coupled to the coupling member and sliding in the crossing direction; a pressure chamber provided in the guide part, a volume of the pressure chamber changing according to slide of the piston; and a rocking absorbing mechanism configured to absorb a rocking motion of the piston centering on an axis extending in the crossing direction. The rocking absorbing mechanism is provided between the coupling member and the slide member, between the shaft and the piston, or between the piston and an inner wall of the guide part.

With such a configuration, it is possible to suppress rocking of the piston with respect to the inner wall of the guide part when the positive displacement machine operates. Consequently, the piston rocks with respect to the inner wall of the guide part centering on the axis extending in the crossing direction. It is possible to suppress wear that occurs between the piston and the inner wall of the guide part. Therefore, it is possible to extend the life of the positive displacement machine.

In the first aspect, the rocking absorbing mechanism may be provided between the coupling member and the shaft and allow one of the coupling member and the shaft to rock with respect to another centering on the axis extending in the crossing direction.

With such a configuration, even when the coupling member moves in the crossing direction according to the rotation of the rotating member and rocks centering on the axis extending in the crossing direction, it is possible to prevent the shaft from rocking together with the coupling member while sliding the shaft coupled to the coupling member in the crossing direction. Accordingly, it is possible to prevent the piston provided at the end portion of the shaft from rocking centering on the axis extending in the crossing direction along the inner wall of the guide part. Therefore, it is possible to suppress wear that occurs between the piston and the inner wall of the guide part and extend the life of the positive displacement machine.

In the first aspect, the rocking absorbing mechanism may be provided between the shaft and the piston and allow one of the shaft and the piston to rock with respect to another centering on the axis extending in the crossing direction.

With such a configuration, even when the shaft is swung together with the coupling member centering on the axis extending in the crossing direction, it is possible to prevent the piston from being swung together with the shaft centering on the axis extending in the crossing direction. Therefore, it is possible to suppress wear that occurs between the piston and the inner wall of the guide part. It is possible to extend the life of the positive displacement machine.

In the first aspect, the rocking absorbing mechanism may be configured by one bearing of a sliding bearing and a rolling bearing.

With such a configuration, the rocking absorbing mechanism can be simply configured. Therefore, it is possible to prevent the configuration of the positive displacement machine from being complicated.

In the first aspect, the positive displacement machine may include a shaft member configured to rotate the rotating member centering on the rotation axis, the shaft member may include a first shaft member and a second shaft member disposed on an opposite side of the first shaft member across the slide member and configured to rotate in an opposite direction of a rotating direction of the first shaft member, and the rotating member may include a first rotating member coupled to the first shaft member and the coupling member and configured to rotate coaxially with the first shaft member and a second rotating member coupled to the second shaft member and the coupling member and configured to rotate coaxially with the second shaft member.

With such a configuration, the first rotating member coupled to the first shaft member and the second rotating member coupled to the second shaft member rotate in opposite directions each other, whereby it is possible to reduce vibration of the positive displacement machine at the time when the slide member coupled to the coupling member coupled to the first rotating member and the second rotating member slides.

With such a configuration of the positive displacement machine, according to the rotation of the first rotating member and the second rotating member in the opposite directions, the coupling member reciprocates in the crossing direction and is swung centering on the axis extending in the crossing direction. In contrast, since the positive displacement machine according to the first aspect includes the rocking absorbing mechanism, it is possible to suppress rocking of the piston with respect to the inner wall of the guide part. Therefore, it is possible to suppress wear that occurs between the piston and the inner wall of the guide part. It is possible to extend the life of the positive displacement machine.

A compressor according to a second aspect of the present disclosure includes: the positive displacement machine according to the first aspect; and a driving device configured to rotate the first rotating member. The piston compresses gas flowing into the pressure chamber.

With such a configuration, it is possible to achieve the same effects as the effects of the positive displacement machine according to the first aspect. Consequently, it is possible to extend the life of the compressor.

A cooling device according to a third aspect of the present disclosure include: the compressor according to the second aspect configured to compress working fluid in a gas phase; a condenser configured to condense the working fluid in the gas phase compressed by the compressor into the working fluid in a liquid phase; an expander configured to decompress the working fluid in the liquid phase condensed by the condenser and change a state of the working fluid to a state in which the liquid phase and the gas phase are mixed; and an evaporator connected to a cooling target to be capable of transferring heat and configured to change the working fluid flowing from the expander to the working fluid in the gas phase with heat transferred from the cooling target and discharge the changed working fluid in the gas phase to the compressor.

With such a configuration, it is possible to achieve the same effects as the effects of the compressor according to the second aspect.

An electronic apparatus according to a fourth aspect of the present disclosure includes the cooling device according to the third aspect.

With such a configuration, it is possible to achieve the same effects as the effects of the cooling device according to the third aspect. Consequently, since a cooling target in the electronic apparatus can be stably cooled, it is possible to extend the life of the electronic apparatus.

What is claimed is:

1. A positive displacement machine comprising:
a case including a tubular guide part in which a pressure chamber is provided;
a slide member including a shaft extending in a first direction and a piston provided at an end portion of the shaft and disposed in the guide part, the slide member sliding in the first direction;
a coupling member coupled to the slide member and extending in a second direction perpendicular to the first direction;
a first rotating member coupled to one end of the coupling member and configured to rotate around a first rotation axis extending in the second direction; and
a rocking absorbing bearing configured to absorb a rocking motion of the piston around an axis extending in the first direction, wherein
the rocking absorbing bearing is provided at a first position between the coupling member and the slide member in the second direction.

2. The positive displacement machine according to claim 1, wherein the rocking absorbing bearing is provided between the coupling member and the shaft of the slide member and configured to allow one of the coupling member and the shaft to rock with respect to the other around the axis extending in the first direction.

3. The positive displacement machine according to claim 1, wherein the rocking absorbing bearing is provided between the shaft and the piston and configured to allow one of the shaft and the piston to rock with respect to the other around the axis extending in the first direction.

4. The positive displacement machine according to claim 2, wherein the rocking absorbing bearing is configured by one of a sliding bearing and a rolling bearing.

5. The positive displacement machine according to claim 1, further comprising:
a second rotating member coupled to another end of the coupling member and configured to rotate around a second rotation axis extending in the second direction;
a first shaft member coupled to the first rotating member and configured to rotate around the first rotation axis of the first rotating member; and
a second shaft member coupled to the second rotating member and configured to rotate around the second rotation axis of the second rotating member, wherein
the second rotating member and the second shaft member are disposed on an opposite side of the first rotating member and the first shaft member with respect to the slide member and rotate in an opposite direction of a rotating direction of the first rotating member and the first shaft member.

6. A compressor comprising:
the positive displacement machine according to claim 1; and
a motor configured to rotate the first rotating member, wherein
the piston compresses gas flowing into the pressure chamber.

7. A cooling device comprising:
the compressor according to claim 6 configured to compress working fluid in a gas phase;
a condenser configured to condense the working fluid in the gas phase compressed by the compressor into the working fluid in a liquid phase;
an expander configured to decompress the working fluid in the liquid phase condensed by the condenser and change the working fluid in the liquid phase to the working fluid in a mixed phase of the liquid phase and the gas phase; and
an evaporator connected to a cooling target to transfer heat and configured to change the working fluid flowing from the expander to the working fluid in the gas phase with heat transferred from the cooling target and discharge the changed working fluid in the gas phase to the compressor.

8. An electronic apparatus comprising the cooling device according to claim 7.

* * * * *